Patented June 4, 1935

2,003,477

UNITED STATES PATENT OFFICE

2,003,477

PROCESS FOR EFFECTING ORGANIC VAPOR PHASE REACTIONS

John C. Woodhouse, Wilmington, Del., assignor, by mesne assignments, to E. I. du Pont de Nemours & Company, Wilmington, Del., a corporation of Delaware No Drawing. Application February 28, 1931, Serial No. 519,276

17 Claims. (Cl. 260—116)

This invention relates to an improved method for accelerating various reactions in which carbon monoxide is utilized and particularly to a method of activating the carbon monoxide therefor.

It is known that many compounds which have slight, if any, catalytic activity for a particular reaction can be made into a highly active catalyst therefor by the use of a suitable promoter. Thus, nickel, which is but a mediocre catalyst for the preparation of hydrogen by the interaction of methane and steam can be made highly active therefor by promoting it with aluminum. However, many organic reactions are not operable upon a commercial scale even with promoted catalysts and others though used commercially are being constantly investigated to improve the catalysts. Particularly is this true of the following reactions when conducted in the vapor phase, all of which involve the action of carbon monoxide upon various compounds and/or elements:

1. $CO+ROH \rightarrow RCOOH$ and/or $HCOOR$
2. $CO+RH+Cl_2 \rightarrow RCOCl+HCl$
3. $CO+NH_3 \rightarrow HCN+H_2O$
4. $CO+R_2O \rightarrow RCOOH$ and/or $HCOOR$
5. $CO+NH_3+H_2 \rightarrow CH_3NH_2+H_2O$
6. $CO+RCl \rightarrow RCOCl$
7. $CO+H_2 \rightarrow HCHO$ and/or $CH_3OH$
8. $CO+RH \rightarrow RCOH$ In the above reactions R indicates an alkyl, aryl, or aralkyl grouping. Thus, in reaction 1, by substituting the alkyl, $CH_3$ for R,—methanol would react with the CO to form acetic acid or methyl formate. In reaction 8, by substituting the aryl, $C_6H_5$, for R,—benzene would react with CO to form benzaldehyde.

In each and all of the above designated reactions carbon monoxide combines chemically with the other compound of the reaction with or without a molecular splitting up of the carbon monoxide. In either event the reaction proceeds but slowly without the aid of a suitable catalyst, and prior to my present invention means resorted to for speeding up the reaction was by a catalyst for the reaction itself. No attempt was made to place the carbon monoxide in a suitable state of activation and to be used in that state as a reactant either prior to or during contact with the catalyst.

An object of this invention is to provide a process for accelerating organic reactions in which carbon monoxide is a reacting constituent. Another object of the invention is to provide a process for accelerating organic reactions by having present with the carbon monoxide which is a reacting constituent a gaseous exciter. Another object of the invention is to provide activated carbon monoxide for vapor phase reactions. Still further objects of this invention are to provide activated carbon monoxide for the preparation of organic acids and/or esters from alcohols and CO; acyl chlorides from hydrocarbons of the methane series, chlorine and CO; alcohols from hydrogen and CO; etc. Other objects will hereinafter appear.

I have found that carbon monoxide can be rendered active for the above designated reactions and many other vapor phase reactions in which it is possible for it to combine with other elements or compounds. This is accomplished by adding to the carbon monoxide a gaseous constituent which may sometimes act as the sole catalyst for accelerating the reaction, in which the resulting gaseous mixture is to be employed, but usually acts in a manner similar to a promoter, i. e. acts jointly with a catalyst which may be promoted and/or supported. It may also act in conjunction with a solid contact mass which itself is inert. In either capacity, I prefer to call such a constituent an exciter in contradistinction to the promoter, usually solid, which is ordinarily associated directly with the catalyst. When using the gaseous exciter in conjunction with another material acting as a catalyst, the latter, if gaseous under the conditions of operation, may be disposed in the gas stream with the exciter, or, if solid, or liquid, it may be disposed in the catalytic reaction chamber over which the carbon monoxide is passed.

Actually the provision of the carbon monoxide active for the reaction is accomplished by admixing therewith an exciter which is suitable for accelerating the particular reaction in which the carbon monoxide is to be employed. It is advantageous to associate the carbon monoxide intimately with the gaseous exciter, after which, the resulting gaseous mixture is passed into the conversion chamber, wherein the reaction is effected in the vapor phase, and in the presence or absence of a solid or gaseous catalyst, as well as in the presence or absence of a solid contact mass by itself inert to the reaction, but usually I prefer to conduct the above reactions in the presence of a solid catalyst.

Carbon monoxide active for various reactions can be provided by the aid of the following enumerated exciters. Altho but a few reactions are given, which may be accelerated by the carbon monoxide in the presence of the exciter, many others will suggest themselves to the expert in this art.

The halogens—chlorine, bromine, iodine, and fluorine—as well as the hydrogen halides, are suitable exciters for the carbon monoxide reactions in which organic acids, esters, and ethers are prepared from the vaporized alcohols and carbon monoxide. The hydrogen halides are likewise suitable for similar use in the formation of esters from the alkyl ethers, organic acids from the hydrocarbons of the methane series and carbon monoxide, and the organic amines from ammonia and carbon monoxide.

The gaseous alkyl halides, such as methyl iodide, ethyl bromide, etc., may be utilized as exciters for the carbon monoxide to accelerate the preparation of acyl chlorides from the alkyl chlorides and carbon monoxide.

The oxides of nitrogen, such as nitrous oxide, nitric oxide, or nitrogen dioxide, may be utilized as exciters for various reactions, viz. the preparation of hydrogen cyanid from ammonia and carbon monoxide, for example.

Although no catalysts are cited in the above examples, it is understood that they are usually employed in conjunction with well known catalysts, for the above reactions. For example, in the preparation of organic acids from alcohols and carbon monoxide the carbon monoxide excited with hydrogen chloride will produce an excellent yield of the acid if the thus excited carbon monoxide is passed, together with the vaporized alcohol, over a cuprous chloride catalyst supported on charcoal.

The above mentioned exciters may be utilized, generally, in the following manner for the provision of carbon monoxide active for the various designated reactions and for other like reactions involving its use. It should be borne in mind that the first object is to thoroughly diffuse the gaseous exciter throughout the carbon monoxide. Since a thoroughly uniform diffusion is difficult of attainment if attempted during the reaction, it is aften advantageous to effect this result prior to the introduction of the carbon monoxide into the reaction. This may be accomplished by injecting the gaseous exciter into the carbon monoxide stream and to insure a thorough admixture of the gases, passing them around baffles or through any suitable tortuous path. The carbon monoxide is now ready for introduction into the conversion chamber wherein it contacts with the other reactant or reactants and is subjected to the pressure and temperature conditions required for that reaction. As these are in the vapor phase it is often of advantage to introduce them into the carbon monoxide prior to their entering the conversion chamber, such operations, however, are governed by the type of reaction, and the pressure and temperature conditions thereof.

The amount of the exciter required with the carbon monoxide will vary in accord with the reaction being effected and the pressures and temperatures involved. Broadly speaking, however, it is ordinarily sufficient if there be present from 0.1 to 5% by volume of the gaseous exciter with the carbon monoxide. The temperature and pressure employed in the reaction will, in each instance, be governed by the particular synthesis although it may be stated that, for most reactions involving the condensation of the carbon monoxide with another reactant or reactants, elevated pressures in the neighborhood of 100–1000 atmospheres will ordinarily materially increase the efficiency of such synthesis.

Although the invention is susceptible of variation as to details of procedure employed, the following examples will illustrate several of a large number of reactions in which carbon monoxide thus treated may be employed:

*Example 1.*—From a gas supply system and under pressure, preferably well in excess of atmospheric, I pass stoichiometric proportions of ammonia and carbon monoxide into a converter of inert material, as aluminum. For the provision of carbon monoxide excited for the reaction there is mixed with this gas before entry into the reaction tube, and either before or after the addition of the ammonia, approximately one percent. of nitric oxide gas. The reaction tube contains thoria prepared in any of the ways normally used for making active thoria catalysts. The temperature of this catalyst bed may be maintained at 200–750° C., but I prefer to hold it at 400–500° C.

The reaction which takes place is—

$$NH_3 + CO \rightarrow HCN + HOH$$

The water and hydrogen cyanide hereby produced are condensed out under pressure as an aqueous solution of the acid. The unreacted gases are drawn off for further treatment by the method outlined above.

*Example 2.*—85 parts of carbon monoxide are thoroughly diffused with 3 parts of hydrogen chloride, the resulting carbon monoxide, together with 5 parts of methanol, 2 parts of hydrogen, and 5 parts of water vapor, are passed into a conversion chamber, in which there is disposed a copper chloride catalyst supported on charcoal, at a temperature of 350° C. and a pressure of 700 atmospheres. An excellent yield of acetic acid and methyl acetate is obtained upon the condensation of the gases from the conversion.

*Example 3.*—In an apparatus for the conversion of carbon monoxide with steam into carbon dioxide and hydrogen, I introduce in the gaseous state small amounts, of the order of 0.1% by volume of the total gas, of bromine just previous to the entry of the carbon monoxide and steam containing gas mixture into the catalyst containing reaction chamber. The apparatus is of the usual type for water gas-hydrogen-steam conversion and consists essentially of humidifier, preheater, and reaction tube. The pressure in the apparatus is from 10–28 atmospheres and the composition of the gas leaving the humidifier is of the order of 12.5% carbon monoxide, 12.5% hydrogen, and 75% steam. This gas is passed through the preheater, reaching a temperature of 10–50° C. below that of the reaction tube, the exciter, as noted above, is added to the dry gas in the preheater, and thoroughly mixed therewith by the use of a baffle system within the preheater. The combined gases pass from the preheater into the reaction tube and over the catalyst at a space velocity computed on the carbon monoxide and hydrogen of 1000. The catalyst temperature is maintained at 325–400° C., at which temperature, substantially equilibrium yields of carbon dioxide and hydrogen are obtained.

There are many organic reactions which are best catalyzed by the aid of two or more catalysts, each having a separate function to perform. In the preparation of alcohol from carbon monoxide and hydrogen, for instance, it is known that a compound catalyst, one constituent of which has a hydrogenating and the other a hydrating action, will further this reaction better than a catalyst having only the ability to effect one of these functions. When effecting such reactions in accord with my invention the carbon monoxide may be excited therefor by one of the required catalytic constituents and the other may be disposed in the chamber in which the reaction is carried out. It is not generally material which constituent be employed as the exciter for the carbon monoxide, its only limitation being, of course, that it must be a gaseous exciter.

From a consideration of the above disclosure, it will be realized that any organic reaction conducted in the vapor phase involving the use of carbon monoxide will come within the scope of this invention if the carbon monoxide employed therein has been rendered active therefor in the presence of a gaseous exciter as hereinbefore described.

I claim:

1. In a process for the synthesis of organic compounds in the vapor phase in which carbon monoxide is one of the reacting constituents the step which comprises synthesizing the organic compounds in the presence of carbon monoxide and a gaseous exciter selected from the group of gaseous exciters comprising the halogens, the hydro-halides, the alkyl halides, and the oxides of nitrogen.

2. In a process for the synthesis of organic compounds in the vapor phase in which carbon monoxide is one of the reacting constituents the step which comprises synthesizing the organic compounds by passing carbon monoxide and gaseous exciter selected from the group of gaseous exciters comprising the halogens, the hydrohalides, the alkyl halides, and the oxides of nitrogen, into the vaporized reacting constituents.

3. In a process for the synthesis of organic compounds in the vapor phase in which carbon monoxide is one of the reacting constituents the step which comprises thoroughly diffusing a gaseous exciter selected from the group of gaseous exciters comprising the halogens, the hydrohalides, the alkyl halides, and the oxides of nitrogen into the carbon monoxide prior to introducing the thus activated carbon monoxide into the vaporized reacting constituents.

4. A process for the synthesis of organic compounds in the vapor phase in which carbon monoxide is one of the reacting constituents which comprises effecting the synthesis in the presence of carbon monoxide containing from 1 to 5% of a gaseous exciter selected from the group of gaseous exciters comprising the halogens, the hydro-halides, the alkyl halides, and the oxides of nitrogen.

5. A process for the synthesis of organic acids in the vapor phase which comprises diffusing an exciter selected from the group of gaseous exciters comprising the halogens, the hydro-halides, the alkyl halides, and the oxides of nitrogen into a carbon monoxide containing gas, and subsequently reacting the resulting gas with a vaporized alcohol.

6. A process for the synthesis of organic acids in the vapor phase which comprises diffusing an exciter selected from the group of gaseous exciters comprising the halogens, the hydro-halides, the alkyl halides, and the oxides of nitrogen into a carbon monoxide containing gas, and subsequently reacting the resulting gas with a vaporized alcohol in the presence of a catalyst.

7. A process for the synthesis of acetic acid in the vapor phase which comprises diffusing carbon monoxide with hydrogen chloride, and subsequently allowing the resulting gas to react with vaporized methanol.

8. A process for the synthesis of hydrocyanic acid which comprises diffusing carbon monoxide with nitric oxide, and subsequently allowing the resulting gas to react with ammonia in the presence of a thoria catalyst.

9. In a process for the synthesis of organic compounds in the vapor phase in which carbon monoxide is one of the reacting constituents the step which comprises synthesizing the organic compound in the presence of carbon monoxide and a halogen containing gas.

10. In a process for the synthesis of organic compounds in the vapor phase in which carbon monoxide is one of the reacting constituents the step which comprises synthesizing the organic compounds in the vapor phase and in the presence of carbon monoxide and a hydrogen halide containing gas.

11. In a process for the synthesis of organic compounds in the vapor phase in which carbon monoxide is one of the reacting constituents the step which comprises synthesizing the organic compound in the vapor phase and in the presence of carbon monoxide and an alkyl halide containing gas.

12. In a process of activating carbon monoxide for increasing the velocity of its interaction with organic compounds the step which comprises admixing nitric oxide with the carbon monoxide prior to the reaction.

13. In a process of activating carbon monoxide for increasing the velocity of its interaction with organic compounds the step which comprises admixing a halogen-containing gas with the carbon monoxide prior to the reaction.

14. In a process of activating carbon monoxide for increasing the velocity of its interaction with organic compounds the step which comprises admixing an alkyl halide with the carbon monoxide prior to the reaction.

15. In a vapor phase process for the preparation of organic compounds in which carbon monoxide is one of the reacting constituents the steps which comprise admixing a gaseous exciter selected from the group of gaseous exciters comprising the halogens, the hydro-halides, the alkyl halides, and the oxides of nitrogen with the carbon monoxide prior to the reaction and subsequently contacting the thus activated carbon monoxide with the vaporized compound with which it is to react.

16. In a process for the synthesis of organic compounds in the vapor phase in which carbon monoxide is one of the reacting constituents the step which comprises activating the carbon monoxide and subsequently reacting it with the other reacting constituents.

17. In a process for the synthesis of organic compounds in the vapor phase in which carbon monoxide is one of the reacting constituents the step which comprises activating the carbon monoxide and subsequently passing it into the vaporized reacting constituents.

JOHN C. WOODHOUSE.